US011314700B1

(12) United States Patent
Yavno et al.

(10) Patent No.: US 11,314,700 B1
(45) Date of Patent: Apr. 26, 2022

(54) NON-NATIVE TRANSACTIONAL SUPPORT FOR DISTRIBUTED COMPUTING ENVIRONMENTS

(71) Applicant: Amazon Technologies, Inc., Seattle, WA (US)

(72) Inventors: Kevin Yavno, Windsor (CA); Chance Ackley, Royal Oak, MI (US); Fletcher Liverance, Berkley, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 642 days.

(21) Appl. No.: 16/055,904

(22) Filed: Aug. 6, 2018

(51) Int. Cl.
| | |
|---|---|
| *G06F 16/00* | (2019.01) |
| *G06F 16/18* | (2019.01) |
| *G06F 3/06* | (2006.01) |
| *G06F 16/16* | (2019.01) |
| *G06F 16/182* | (2019.01) |

(52) U.S. Cl.
CPC .......... *G06F 16/1865* (2019.01); *G06F 3/067* (2013.01); *G06F 3/0614* (2013.01); *G06F 3/0629* (2013.01); *G06F 16/164* (2019.01); *G06F 16/182* (2019.01)

(58) Field of Classification Search
CPC .. G06F 16/1865; G06F 16/182; G06F 16/164; G06F 3/0614; G06F 3/0629; G06F 3/067
See application file for complete search history.

(56) References Cited

U.S. PATENT DOCUMENTS

| | | | |
|---|---|---|---|
| 9,495,478 B2 | 11/2016 | Hendrickson et al. | |
| 9,710,407 B2 | 7/2017 | Oikarinen et al. | |
| 2011/0066668 A1* | 3/2011 | Guarraci | G06F 16/27 707/831 |
| 2015/0280959 A1* | 10/2015 | Vincent | G06F 3/0622 709/203 |
| 2017/0344305 A1* | 11/2017 | Goto | G06F 16/13 |
| 2019/0384495 A1* | 12/2019 | Balcha | G06F 3/0647 |

OTHER PUBLICATIONS

John H. Howard et al, Scale and Performance in a Distributed File System (Feb. 1988), ACM Transactions cm Computer Systems, vol. 6, No. 1, pp. 51-81 (Year: 1988).*

* cited by examiner

*Primary Examiner* — William B Partridge
*Assistant Examiner* — Suman Rajaputra
(74) *Attorney, Agent, or Firm* — K&L Gates LLP

(57) ABSTRACT

Techniques are generally described for adding transactional support to a distributed storage environment. In various examples, first data may be written to a first set of locations in a distributed computer-readable non-transitory storage system through a non-transactional file system interface. In various further examples, metadata associated with the first data may be generated during the writing of the first data. In some examples, the metadata may be stored associated with the first data in at least a second location in a second computer-readable non-transitory memory. In some examples, a manifest may be generated defining a transactional commit of at least a portion of the first data. In some examples, the manifest may be generated by processing the metadata using first committer logic. In some further examples, the manifest may be stored in a third computer-readable non-transitory memory.

19 Claims, 9 Drawing Sheets

US 11,314,700 B1

NON-NATIVE TRANSACTIONAL SUPPORT FOR DISTRIBUTED COMPUTING ENVIRONMENTS

BACKGROUND

Computer networks often interconnect numerous computing systems to support their operations with the computing systems being co-located (e.g., as part of a local network) or located in distinct geographical locations and connected via one or more private or public intermediate networks. Data centers hosting large numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide facilities that also include hardware resources made available for use by their customers.

DETAILED DESCRIPTION

Figure 1:
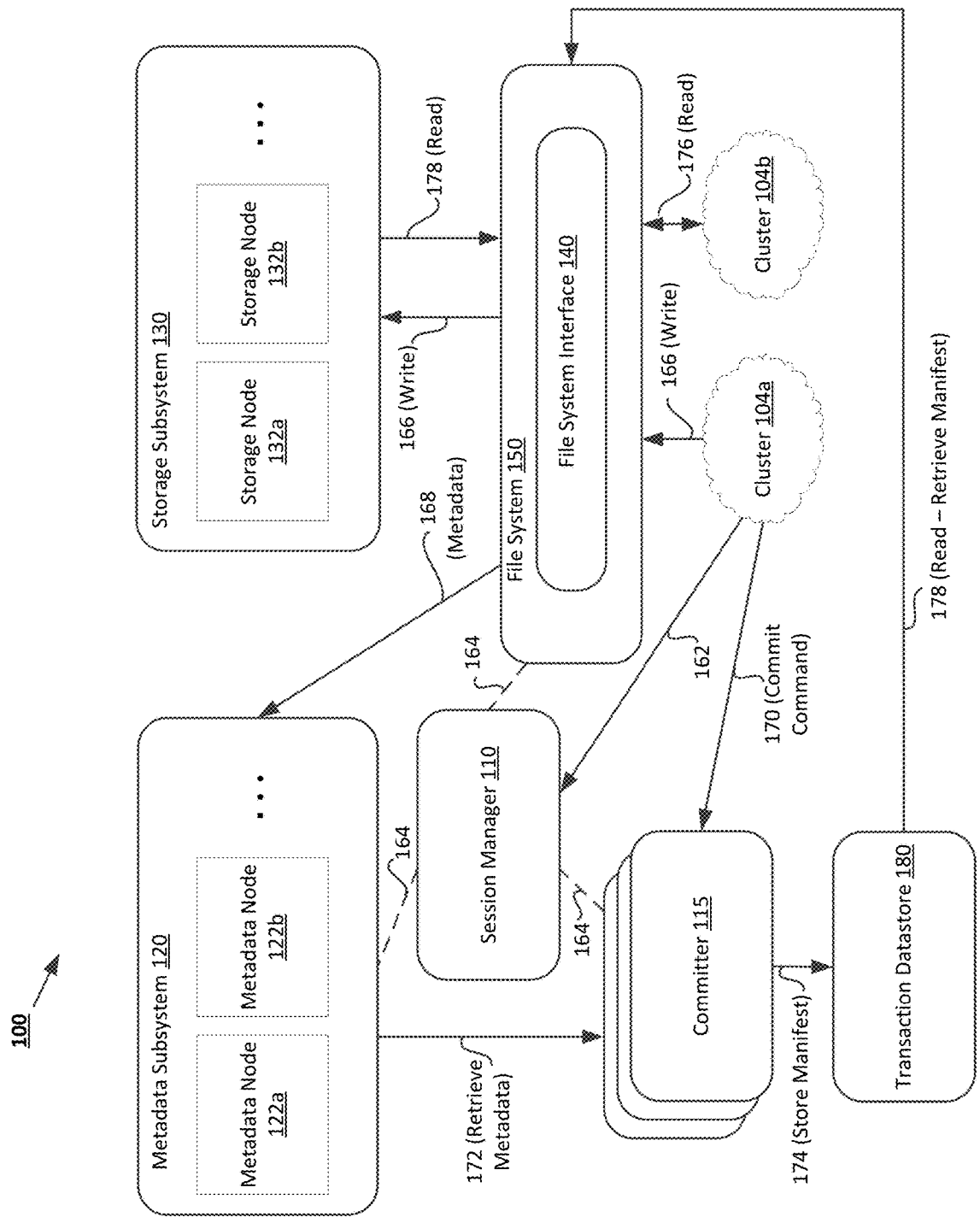
FIG. 1 depicts a high-level overview of a distributed storage service, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Some computing service provider networks implement a variety of storage services, such as services that implement block-level devices (volumes). However, a number of applications running at data centers on a computing service provider network may face limitations with respect to use of some of the more common storage-related programmatic interfaces, such as various industry-standard file system interfaces. Some industry-standard file systems may have been designed without accommodation for the large-scale deployment of network-accessible services, and may therefore support consistency models and other semantics that are not straightforward to implement in distributed systems in which asynchronous computational interactions (e.g., asynchronous writes and/or reads by different compute nodes to/from a distributed network-accessible storage), failures of individual components, and network partitions and/or networking-related delays are relatively common. Additionally, various standard file system interfaces used in a distributed storage context lack transactional support and therefore may be unable to support features of ACID-compliant (atomicity, consistency, isolation, and durability) functionality.

Atomicity refers to an "all or nothing" aspect of a database transaction. If one part of the transaction fails, the entire transaction is treated as having failed and the database state is left unchanged. Atomic transactions ensure atomicity in situations such as power failures, errors and/or crashes. An atomic transaction appears to a device reading the committed data as an indivisible set of effects on a database. In various examples described herein, the databases (or other data structures) may be distributed among multiple different object block datastores. Consistency refers to a database property that brings the database from one valid state to another during a transaction. Transactions in consistent databases (or other data structures) cannot result in the violation of any defined rules for the database. Isolation refers to the property of a database that ensures that the concurrent execution of transactions results in the same system state as if the transactions were executed sequentially. Durability refers to the property of a database that ensures that once a transaction has been committed, it remains so, even in the event of power loss, system crash, or errors. For example, in a relational database, once a group of SQL statements execute, the results are stored permanently even if the database crashes immediately following execution.

Various embodiments of methods and apparatus for a high-availability, high-durability scalable distributed storage system that provides session management and configurable transaction commit logic to achieve transaction support over a standard file system interface (e.g., a non-transactional file system and an underlying object/block datastore) are generally described. In various examples, the systems and methods described herein may provide transaction support to distributed storage systems without modifying the base file system interface (and/or block data store interface) even where the base file system does not include native transactional support. Examples of non-transactional file systems (e.g., file systems without native transactional support) may include a standard UNIX file system. As used herein a transaction refers to an indivisible operation through which data that is the subject of a write operation is committed to a database as a single unit. During the transaction, a manifest (e.g., a data structure) of metadata representing data committed to the database(s) as a part of the committed transaction (e.g., describing data written as a transaction, according to the particular committer logic) is generated. The manifest is published (e.g., stored in a transaction store that is accessible by one or more compute nodes and/or clusters that are permitted to read the committed data). The storage of such a manifest renders the transaction visible to subsequent compute nodes and/or clusters of compute nodes such that the committed data may be read from the storage according to the manifest. Transactions either succeed or fail and may not partially complete (e.g., due to atomicity). Accordingly, transactions help ensure that data-oriented resources are not permanently updated in a data structure unless all operations within the transactional unit complete successfully. Transactions aid in error recovery (e.g., through a "rollback" of a transaction), and allow for consistent data state when a data structure (e.g., a database) is accessible by multiple client devices.

The various systems described herein allow individual compute nodes and/or clusters of compute nodes to write to a distributed object block datastore using a standard file system interface as though the object block data store is non-transactional. However, the various systems described herein may be effective to impart transactional support in a distributed computing environment using session management, user-configurable commit logic, and metadata generated during write operations. Additionally, the various committers, the metadata storage, session management, and the command logic storage are composable, such that a particular user may tailor the system to the user's individual needs for a particular system and/or task. Finally, from the perspective of a compute node (or cluster of compute nodes) reading data stored using the various systems described herein, a read appears to be a standard read operation as from a standard file system interface. Accordingly, in an example scenario using conventional file system read/write operations, a cluster of compute nodes reading a set of files during an on-going write operation (e.g., by a different cluster of compute nodes) may receive partially old files and partially new, overwritten files. In contrast, various transactional systems described herein may allow a read operation during an on-going write operation to provide the older version of the set of files until the write operation has completed and the committer has committed the new versions of the files to the object block datastore. During the commit a manifest describing the data written and/or including information as to how to read the data may be published so that various compute nodes and/or clusters of compute nodes may read data committed during the transaction. Additionally, rollbacks of corrupted data may be much simpler due to the transactionality imparted by the various systems described herein.

As used herein, a datastore may be a repository for storing and managing collections of data such as databases, files, emails, virtual machine images, etc. A datastore, as used herein, may generally refer to a storage architecture that manages data as blocks (e.g., fixed length chunks of data), files, and/or objects (e.g., a piece of data including a unique identifier). A distributed datastore may refer to a datastore that is distributed among multiple storage devices and/or systems. In various examples, distributed block datastores may be decentralized. A file system, as used herein, may refer to structure and logic rules for managing groups of data organized into files, as well as for managing the names of the files.

FIG. 1 depicts a high-level overview of a distributed storage service, in accordance with various embodiments of the present disclosure. As shown, system 100 may, in some examples, be logically divided into various subsystems. For example, system 100 may comprise a storage subsystem 130, a metadata subsystem 120, one or more session managers 110, one or more committers 115, and/or one or more transaction datastores 180. In various examples, storage subsystem 130 may comprise a plurality of nodes, such as storage nodes 132a, 132b, etc. Similarly, in various examples, metadata subsystem 120 may comprise metadata nodes 122a, 122b, etc. In various examples, the storage systems described herein may be distributed insofar as a plurality of different storage nodes 132a, 132b, etc., may be used to store data on one or more physical disks that, in turn, may be co-located and/or geographically diverse. In various examples, multiple compute nodes and/or clusters of compute nodes may have access to the distributed storage systems and may write to and/or read from the distributed storage systems as though the datastores were local to the compute nodes and/or clusters of compute nodes. A cluster of compute nodes may be a set of multiple compute nodes controlled by software to work together to perform one or more tasks. In various examples, a cluster of compute nodes may comprise a master compute node and one or more slave compute nodes. A master compute node may handle the scheduling and management of slave compute nodes.

Each compute node may, for example, be implemented as a set of processes or threads executed at a respective physical or virtualized server in some embodiments. The number of nodes in any given subsystem may be modified independently of the number of nodes in the other subsystems in at least some embodiments, thereby allowing deployment of additional resources as needed at any of the subsystems (as well as similarly independent reduction of resources at any of the subsystems).

In various examples, storage nodes 132a, 132b, etc., may represent some amount of storage space at some set of physical storage devices (which may be physically co-located or distributed at different geographical locations). In various examples, storage nodes 132 may store data objects, which may be organized as a set of logical blocks and each logical block may be mapped to a set of pages.

In the example depicted in FIG. 1, one or more compute nodes of cluster 104a may be directed to write data to storage subsystem 130. In the example, a master node of cluster 104a may call and/or initialize session manager 110 at operation 162. Session manager 110 may instantiate file system 150, committer 115, and metadata subsystem 120 (including metadata nodes 122a, 122b, etc.) at operation 164.

One or more compute nodes of cluster 104a may thereafter write data at operation 166 through file system 150 to one or more storage nodes 132a, 132b, etc., of storage subsystem 130. While data is written by compute nodes of cluster 104a, file system 150 may generate metadata associated with the data written at operation 168. For example, as described in further detail below, the metadata may describe various statistics about the data written. The metadata may be sent to and stored at one or more metadata nodes 122a, 122b, etc., of metadata subsystem 120.

After compute nodes of cluster 104a have concluded writing data to storage subsystem 130, the master node of cluster 104a may call committer 115 at operation 170. At operation 172, the committer 115 retrieves the metadata generated by file system 150 during the write operation 166 (e.g., metadata generated at operation 168 and sent to metadata subsystem 120 during write operation 166). Committer 115 may be effective to use the metadata generated by file system 150 during the write operation 166 to generate a manifest of data committed as part of a transaction. Manifest may be sent to and stored by a transaction datastore 180 at operation 174. Once the manifest is stored by transaction datastore 180, or otherwise published, the write operation initiated at operation 166 is concluded. Although transaction datastore 180 is shown in FIG. 1 as a distinct element, in various examples, transaction datastore 180 may be part of storage subsystem 130 and/or metadata subsystem 120, etc. Additionally, transaction datastore 180 may be located wholly or in part at the cluster performing the write operation 166. In various other examples, transaction datastore 180 may be located at one or more other locations apart from what is shown in FIG. 1.

As described in further detail below, committer 115 may generate a manifest comprising metadata describing the data committed as part the transaction. In various examples, the manifest may be a data structure that may, in effect, define the transaction for subsequent readers of the committed data. The particular committer logic of the committer 115 may generate the manifest such that the written data described in the manifest (and/or indications thereof) is different from the data written during operation 166. For example, partial files may be combined into a single file and an indication of the single, combined file may be stored in the manifest. Similarly, temporary and/or "junk" files (and/or indications thereof) may be omitted from the manifest, such that the temporary and/or junk files are not considered part of the transaction, and as such may not thereafter be read by a reading node consulting the manifest. In general, the manifest defines a transactional commit of at least a portion of the underlying written data. The manifest describes the content of the transaction such that subsequent reading devices may retrieve and use the manifest to determine what and how to read data from storage subsystem 130 stored during the transaction. Committer 115 may send the manifest to transaction datastore 180 at operation 174.

Subsequently, one or more compute nodes of cluster 104b may initiate a read from storage subsystem 130. One or more compute nodes of cluster 104b may initiate a read request at operation 176. The read request 176 may be a standard read request sent to file system 150. At operation 178, the file system 150 may retrieve the manifest stored at transaction datastore 180. The manifest may provide service data, including a description of data, instructions for accessing the data, and/or a location of data stored during the transaction to file system 150. Accordingly, file system 150 may return the requested data from storage subsystem 130 as in a standard read operation using file system 150. Accordingly, using the various techniques described herein, transactional support may be imparted to a non-transactional file system in a distributed storage environment. Compute nodes and/or clusters of compute nodes reading from a distributed storage system (e.g., storage subsystem 130) may reference the manifest of a transactional commit and may thereafter submit standard read requests to the file system. Accordingly, transactional functionality may be imparted without modifying the base file system interface of file system 150.

In various examples, the metadata associated with data written to storage subsystem 130 may be stored locally on the compute node and/or cluster performing the write operation, while in various other examples the metadata associated with the files may be stored at one or more locations remote to the writing cluster or node. In other words, metadata subsystem 120 may be local to the writing cluster or may be located remotely (or some combination thereof). In at least some examples, the metadata associated with each file may be generated by file system 150 as a consequence of writing the file to the file system. Additionally, transaction datastore 180 may be local to the writing cluster or may be located remotely (or some combination thereof).

In various examples, the committer 115 may be effective to generate the manifest using the metadata stored at metadata subsystem 120 during the write operation (e.g., write operation 166). The manifest may comprise a representation (in the form of metadata) of the files and/or other data written during the write operation. In at least some examples, the manifest may be registered (e.g., indexed) with the write location of the write operation so as to associate the manifest with the location of the written data. Further, in at least some examples, the manifest may include information describing how to access data written as part of the transaction.

Although metadata subsystem 120 and clusters 104a, 104b are depicted in FIG. 1 as being separate logical components, in some examples, metadata subsystem 120 may comprise one or more components of a cluster or clusters performing a write operation. Additionally, although the example above describes writing files to the storage subsystem 130, various other data types may be written (e.g., streams).

In various examples, session manager 110 may store metadata and/or may direct file system 150 to store metadata generated during the write operation 166 in metadata nodes 122a, 122b, . . . , of metadata subsystem 120. Additionally, as previously described, committer 115 may generate a manifest identifying data written as a transaction. In some examples, the metadata and/or the manifest may be stored locally on the cluster performing the write operation, while in other examples, the metadata and/or the manifest may be stored remotely from the writing cluster (or stored at some combination of the local, writing cluster and remote locations).

A master compute node or other computing device may control one or more committers 115 to commit the data written as a transaction. Upon receiving a commit command 170 from the master node or other computing device, the committer 115 may retrieve the metadata generated during the write operation 166 from metadata subsystem 120 and may generate a manifest representative of the transaction and including detail regarding the data stored as part of the transaction and how to access the data stored during the transaction. Accordingly, transactional functionality may be introduced to a standard file system write operation in a distributed compute environment using metadata generated during the write operation and using committer logic to generate a manifest of the transaction.

In various examples, the metadata stored in metadata subsystem 120 may be stored in an ephemeral location and may be used by one or more committers 115 during a commit of the data to an object datastore. In an example where the metadata is stored in an ephemeral location, the metadata may be deleted from metadata subsystem 120 after the data is committed to the object datastore (e.g., after generation and storage/publication of the manifest). Advantageously, ephemerally storing the metadata may conserve computing resources such as memory and/or processing resources. However, in various other examples, the metadata generated during the write operation (e.g., write operation 166) may be stored for longer periods of time and may persist in memory following the commit.

File system 150 may be a standard file system that may access storage subsystem 130 to perform writes of data and/or reads of stored data. The file system 150 may comprise a file system interface 140 through which a compute node(s) and/or a cluster may write data to and/or read data from storage subsystem 130. In various examples, individual clients of the system 100 (e.g., one or more clusters and/or compute nodes) may supply their own commit logic pertaining to that particular client. As such, multiple committers 115 are depicted in system 100 of FIG. 1. Accordingly, cluster 104a may be associated with a first committer 115 and cluster 104b may be associated with a second committer 115. Accordingly, the system 100 may enable non-transactional systems and file system-like block datastores to support transactions via user-defined commit logic in a distributed datastore. Additionally, such transactional functionality may be imparted without modifying the base file system interface.

In various examples, a transaction commit may be performed using a particular committer 115. As previously described, in some examples, a particular committer 115 may be selected in various ways. In some examples, a particular committer 115 may be associated with a particular cluster 104a, 104b, or a particular compute node that is performing the write operation. In various other examples, the particular cluster and/or compute node that is performing the write operation may select a committer 115 by specifying the committer during the call to session manager 110 (e.g., operation 162). The session manager 110 may thereafter instantiate the specified committer 115. In at least some examples, the committer 115 may be associated with the file system 150 that the write operation 166 is using to write to the distributed storage system. For example, a High Density File System (HDFS) may be associated with an Apache Parquet specific committer. In various examples in accordance with the distributed storage service described herein, logic associated with a particular committer 115 may be effective to recognize and parse files of a given format (or formats) based on the structure of the file format. As described in further detail below, the committer 115 may be effective to commit files to a database in a transaction upon receiving a command from a cluster (e.g., commit command 170) and/or from another computing device.

Figure 2A:
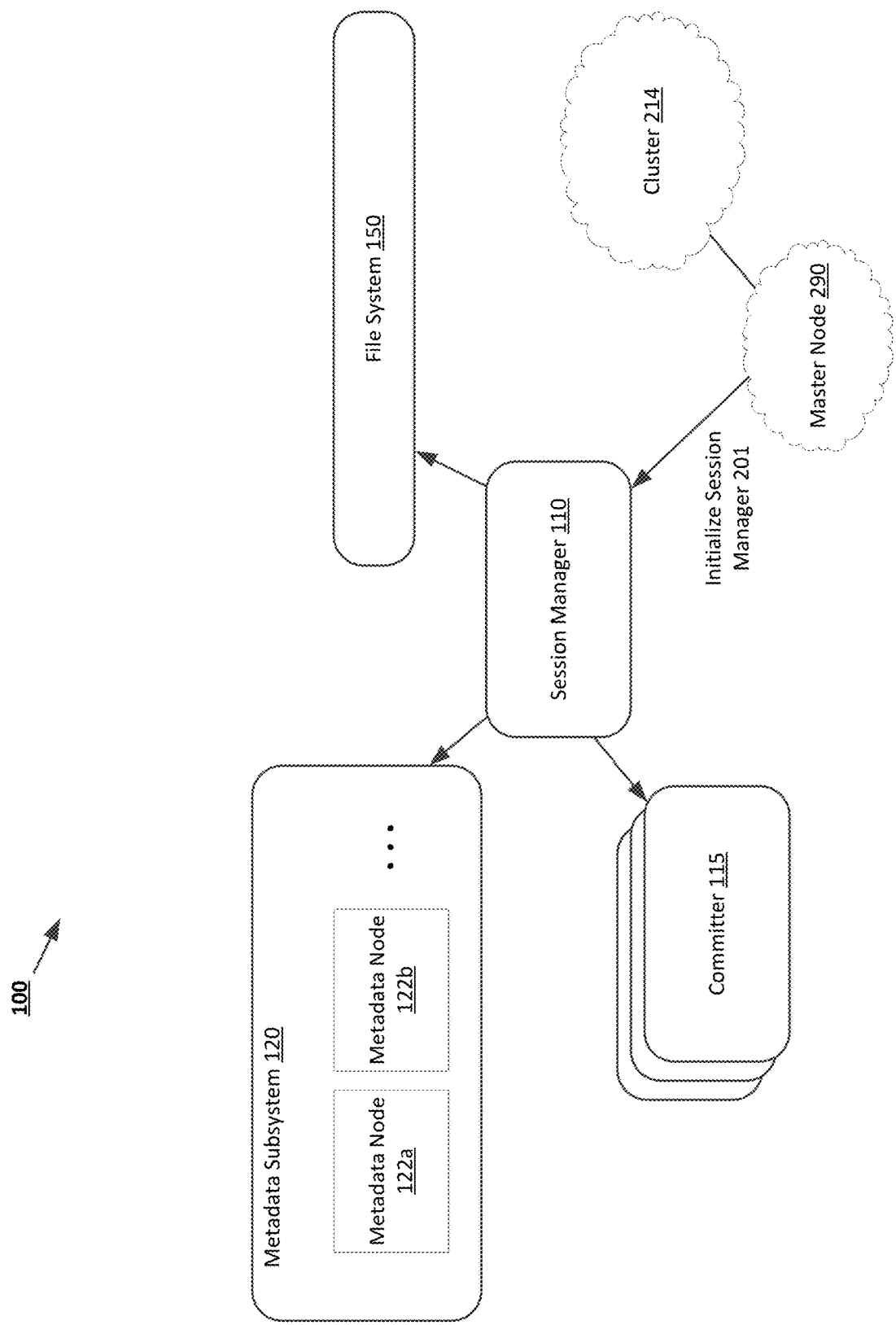
FIG. 2A depicts an example of operations performed prior to a write operation, in accordance with various embodiments of the distributed storage service described herein.

FIG. 2A depicts an example of operations performed prior to a write operation, in accordance with various embodiments of the distributed storage service described herein.

In the example depicted in FIG. 2A, master node 290 of cluster 214 may call session manager 110 at operation 201—Initialize Session Manager. In various examples, master node 290 may optionally specify a particular committer 115 in the call to session manager 110. In various other examples, no committer may be specified and session manager 110 and/or file system 150 may select a committer 115 for a transaction. Session manager 110 may instantiate file system 150, committer 115, and metadata subsystem 120. In various examples, file system 150 may be a non-transactional file system (e.g., a file system that does not natively support transactions). As previously described, metadata subsystem 120 may store metadata generated by file system 150 during a write operation (e.g., during the write operation depicted in FIG. 2B).

Figure 2B:
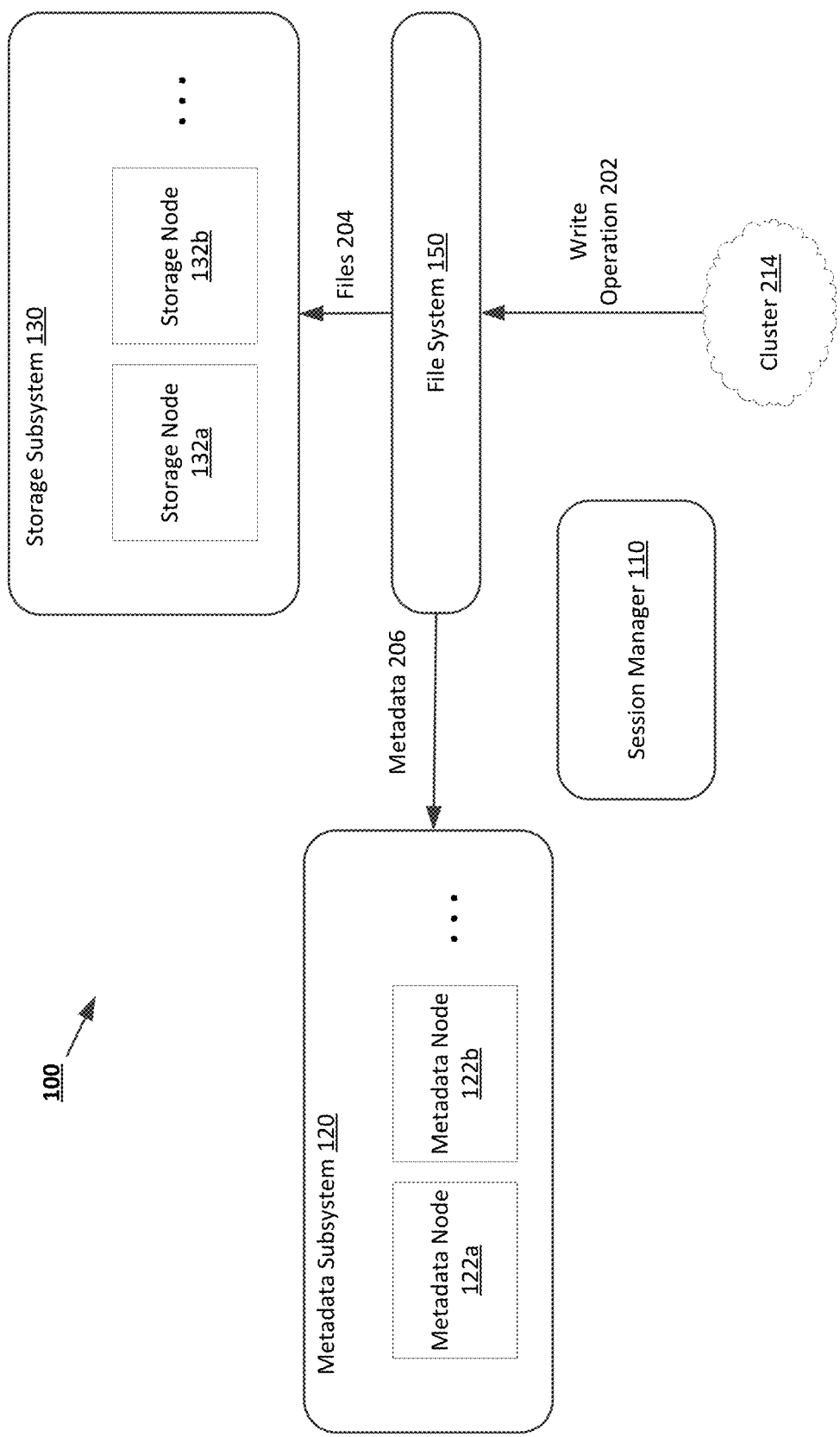
FIG. 2B depicts an example of operations performed during a write operation, in accordance with various embodiments of the distributed storage service described herein.

FIG. 2B depicts an example of operations performed during a write operation, in accordance with various embodiments of the distributed storage service described herein.

In the example depicted in FIG. 2B, cluster 214, comprising a plurality of compute nodes, may perform write operation 202 to write files 204 to a file system of distributed storage subsystem 130. Although, in FIG. 2B, files 204 are written, in various other examples other types of data may instead be written in accordance with the various embodiments described herein. File system 150 may write files 204 to storage subsystem 130. As described in further detail below, at least some of the files 204 (and/or modified versions and/or portions thereof) may thereafter be committed as part of a transaction in accordance with the particular committer logic used to perform the commit. During the write operation of files 204, file system 150 may generate metadata 206 associated with the files 204. Session manager 110 may store (or may control file system 150 to store) metadata 206 in metadata subsystem 120 (including in, for example, metadata nodes 122a, 122b, etc.). As described in further detail below, metadata 206 may be used by committer 115 (not shown in FIG. 2B) to generate a manifest describing a transaction.

In various examples, metadata generated during the write operation (and associated with the data written therein) may describe characteristics of the particular files 204 written and may identify individual files from among other files. For example, metadata associated with a particular file may comprise an identification of encoding type, file format, tagging information, file pointers (and/or remote file locations if referencing locations outside the system), directory information, region identifiers, file length, file size, statistics about the files/data, filters, partition information, encryption information, etc.

Figure 3A:
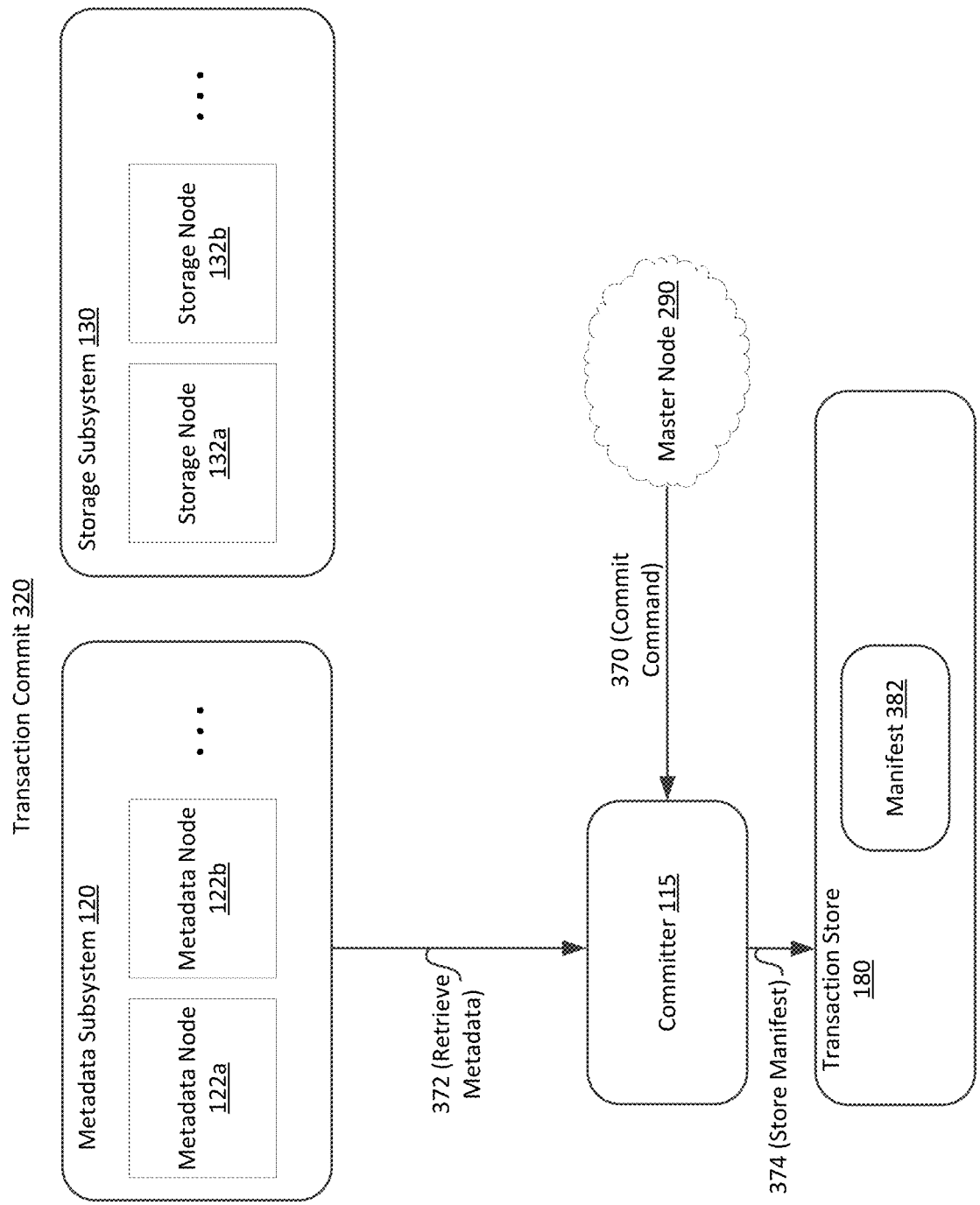
FIG. 3A is an example diagram describing a transaction commit in a distributed storage service, in accordance with embodiments of the present disclosure.

FIG. 3A is an example diagram describing a transaction commit 320 in a distributed storage service, in accordance with embodiments of the present disclosure.

After the completion of the write operation 202 depicted in FIG. 2B (e.g., after all files 204, or other data have been written to storage subsystem 130), master node 290 may send a commit command 370 to committer 115. As previously described, committer 115 may be instantiated by session manager 110 (not shown in FIG. 3A). In various other examples, master node 290 may request a different committer 115 through session manager 110 after the completion of the write operation.

In response to the commit command 370, committer 115 may retrieve the metadata (e.g., metadata 206 from FIG. 2B) from metadata subsystem 120 during operation 372. As previously described, the metadata may describe the data written to storage subsystem 130 during write operation 202 of FIG. 2B.

Committer 115 may use the metadata retrieved at operation 372 to generate a manifest 382 describing data written during write operation 202. In various examples, manifest 382 may represent data written during write operation 202 (and/or modifications thereof) committed as a transaction. The particular committer logic of the committer 115 may generate the manifest defining the transactional commit of at least a portion of the data written during write operation 202. In various examples, the committer logic may modify data structures of the underlying written data, such that the data described in the manifest is different from the data written during the original write operation (e.g., write operation 202). For example, committer 115 may determine that partial files written during the write operation 202 may be combined into a single file. Accordingly, committer 115 may store an indication of a single combined file (and/or instructions for reading the combined file as well as other information regarding the combined file) in manifest 382. In another example, indications of temporary and/or "junk" files written during the write operation may be omitted from manifest 382, etc.

In various examples, the commit logic may modify the original file structure during the commit (e.g., during generation of the manifest 382). For example, during the write operation 20 part files may be written. Metadata generated during the write operation may represent the 20 part files. The particular committer logic of committer 115 may recognize (e.g., based on the file format structure of the 20 part files) the 20 part files as a single file and may represent the 20 part files as a single file of a different structure or format in manifest 382. In various other examples, a write operation may commonly create a number of temporary files that are no longer deemed to be necessary and that are generated as a consequence of the write operation. Accordingly, the committer logic of committer 115 may be configured such that such temporary files are not represented in manifest 382.

In general, the manifest 382 may describe (or define) the content of the transaction such that subsequent reading devices may retrieve and use the manifest 382 to determine what and how to read data from storage subsystem 130 stored during the transaction. Committer 115 may send the manifest 382 to transaction datastore 180 at operation 374.

In various examples, committer logic may be user-defined to suit a particular user's purpose. For example, a committer may be designed to detect a particular directory structure of files written during write operation 202 using metadata retrieved at operation 372. The committer may be designed to commit data based on the file directory structure to a few different partitions. For example, the file directory structure of the files may specify a region ID (e.g., United States, Mexico, Canada, etc.) and a marketplace ID (e.g., an identifier describing a particular region of a market, such as "North America"). A particular committer 115 may be selected that commits each separate region ID as its own transaction (e.g., each separate region ID may have its own manifest). Accordingly, in a first transaction all files specifying "United States" as the region ID may be committed in a first manifest, followed by a second transaction in which all files specifying "Mexico" are committed in a second manifest, and so on. In another example, a different committer 115 may be selected that commits all files with the marketplace ID "North America" as a single transaction (e.g., in a single manifest). Accordingly, users may select the committer 115 according to a desired implementation. In many examples, the file formatter may be associated with a committer 115 that is able to recognize and parse the way the particular file formatter writes the file format. Accordingly, each file format may be associated with a committer 115 or a set of committers 115. As such, a user of the distributed storage systems described herein may not need to write their own unique committer 115, but may instead use a default committer (e.g., default committer logic) for the particular file format in use.

Figure 3B:
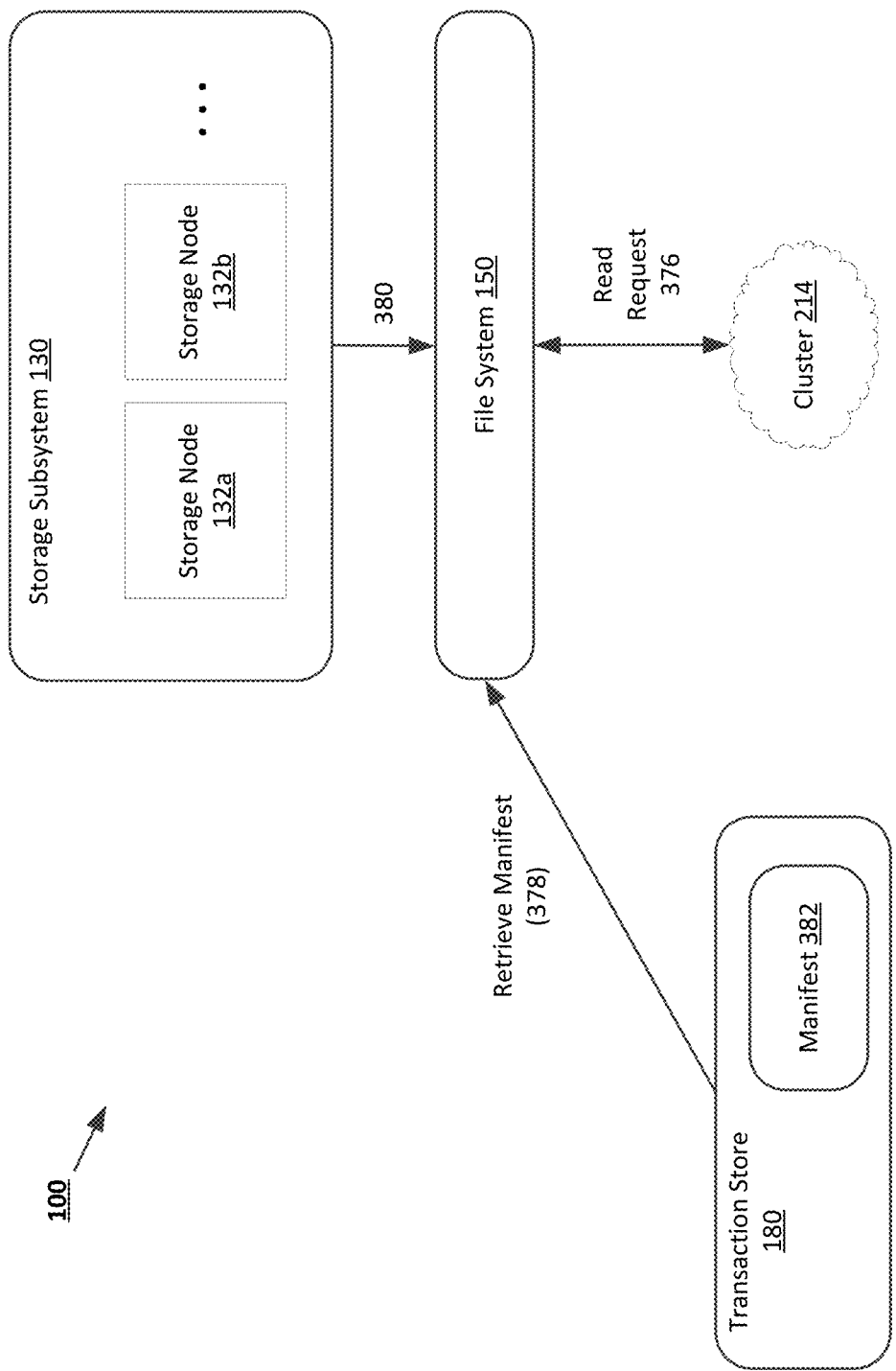
FIG. 3B is an example of operations performed during a read operation, in accordance with various embodiments of the distributed storage service described herein.

FIG. 3B is an example of operations performed during a read operation, in accordance with various embodiments of the distributed storage service described herein.

At operation 376, one or more compute nodes of cluster 214 may send a read request 376 to file system 150. In response, at operation 378, the file system 150 may retrieve the manifest stored at transaction datastore 180. The manifest may provide services, including a description of data and/or a location of data stored as part of a transaction. File system 150 may read the data specified in the manifest 382 according to read request 376 at read operation 380. In an example, manifest 382 may omit so-called "junk" files written during the write operation. Accordingly, the read operation 380 may skip locations in memory corresponding to the junk files according to manifest 382.

The read request 376 may be a standard read request sent to file system 150. In response to the read request 376, file system 150 may retrieve the manifest 382 and may read data according to the manifest 382. Accordingly, file system 150 may return the requested data from storage subsystem 130 as in a standard read operation using file system 150. Accordingly, using the various techniques described herein, transactional support may be imparted to a non-transactional file system in a distributed storage environment. Compute nodes and/or clusters of compute nodes reading from a distributed storage system (e.g., storage subsystem 130) may submit standard read requests to the file system. Accordingly, transactional functionality may be imparted without modifying the base file system interface of file system 150.

Advantageously, non-transactional file systems and file system-like block datastores may use the architecture described herein to support transactions via user-defined commit logic (and/or via default commit logic) without modifying the base file system interface. In a particular example, a distributed cluster of a plurality of compute nodes may be writing independently to a particular block(s) of data stored in a distributed storage system. However, because of the transactional functionality introduced using the various techniques described herein, readers reading the particular block(s) of data may all receive the same data. Essentially, the technology described herein allows the distributed storage system to behave as a non-distributed system for the purposes of accessing consistent data even while data is being continually written into object block datastores from one or more different nodes.

In another example, a single cluster may be designated to read a set of files. A different cluster may be designated to write the set of files. The cluster designated to write the set of files may begin overwriting the files with new data at a first time. Thereafter, before the completion of the write, the cluster designated to read the set of files may read from the files. In a non-transactional system, the reading cluster may receive half over-written files and half old files, or may get half deleted files and half written files that are corrupted, causing a system failure. Alternatively the writing cluster may crash before the write is complete leading to inconsistent data. The problem may be compounded when large amounts of data are written/read, as writes of terabytes or petabytes of data may take hours or even days, offering ample time for intermittent reads which may lead to corrupted and/or inconsistent data.

However, the various techniques and architectures described herein allow transactional functionality to be introduced within such systems without modifying the base file system interface. Accordingly, in the example above, the writing cluster will continue writing until completion and thereafter may commit the files in a transaction (e.g., by generating a manifest and publishing the manifest at the transaction store). Prior to the commit (e.g., prior to the publication of the manifest), the reading cluster will receive only the older version of the files. After the commit (e.g., after publication of the manifest), the reading cluster will receive only the new version of the files, eliminating the opportunity for data corruption. Additionally, rollbacks of data are made simpler, as an "un-commit" operation may be used to undo the commit, thereby rolling back to the older version of the data.

Figure 4:
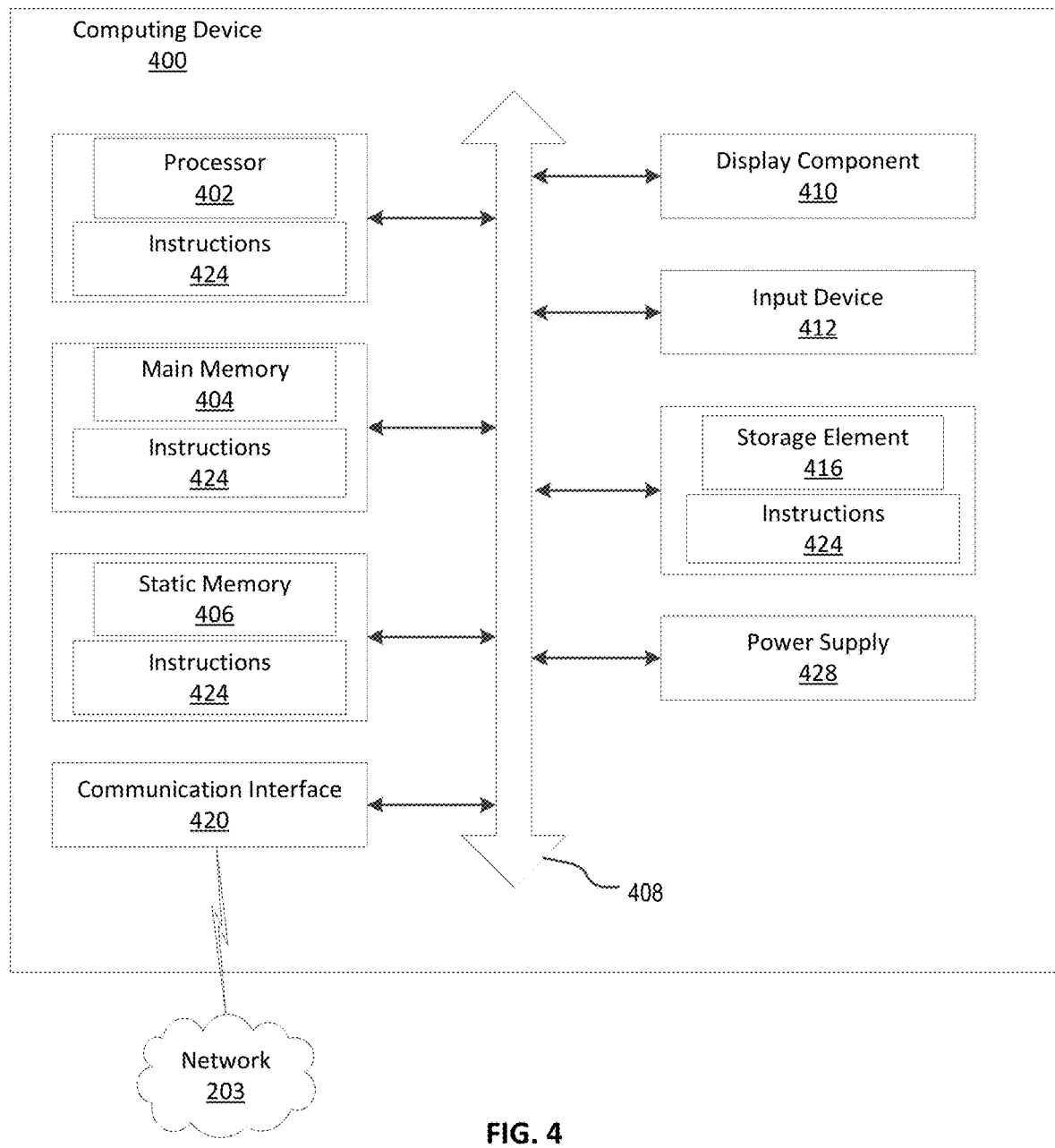
FIG. 4 depicts an example computing device that may be used in accordance with various embodiments of the present disclosure.

Referring to FIG. 4, the block diagram illustrates components of a computing device 400, according to some example embodiments, able to read instructions 424 from a non-transitory computer-readable storage medium (e.g., a hard drive storage system or other memory) and perform any one or more of the methodologies discussed herein, in whole or in part. Specifically, FIG. 4 shows the computing device 400 in the example form of a computer system within which the instructions 424 (e.g., software, a program, an application, an applet, an app, or other executable code) for causing the computing device 400 to perform any one or more of the methodologies discussed herein may be executed, in whole or in part. For example, the computing device may perform one or more of the functions of the data storage system described above with respect to FIGS. 1-3B. Computing device 400 may be an example of a compute node of a cluster of computing nodes (e.g., cluster 104a, 104b from FIG. 1).

In alternative embodiments, the computing device 400 operates as a standalone device or may be connected (e.g., networked) to other computing devices. In a networked deployment, the computing device 400 may operate in the capacity of a server computing device or a client computing device in a server-client network environment, or as a peer computing device in a distributed (e.g., peer-to-peer) network environment. The computing device 400 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any computing device capable of executing the instructions 424, sequentially or otherwise, that specify actions to be taken by that computing device. Further, while only a single computing device 400 is illustrated, the term "computing device" shall also be taken to include any collection of computing devices that individually or jointly execute the instructions 424 to perform all or part of any one or more of the methodologies discussed herein.

The computing device 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The computing device 400 may further include a display component 410. The display component 410 may comprise, for example, one or more devices such as cathode ray tubes (CRTs), liquid crystal display (LCD) screens, gas plasma-based flat panel displays, LCD projectors, or other types of display devices.

The computing device 400 may include one or more input devices 412 operable to receive inputs from a user. The input devices 412 can include, for example, a push button, touch pad, touch screen, wheel, joystick, keyboard, mouse, trackball, keypad, accelerometer, light gun, game controller, or any other such device or element whereby a user can provide inputs to the computing device 400. These input devices 412 may be physically incorporated into the computing device 400 or operably coupled to the computing device 400 via wired or wireless interface. For computing devices with touchscreen displays, the input devices 412 can include a touch sensor that operates in conjunction with the display component 410 to permit users to interact with the image displayed by the display component 410 using touch inputs (e.g., with a finger or stylus).

The computing device 400 may also include at least one communication interface 420, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the communication interface 420 may also or alternatively comprise one or more wired communications interfaces for coupling and communicating with other devices.

The computing device 400 may also include a power supply 428, such as, for example, a rechargeable battery operable to be recharged through conventional plug-in approaches or through other approaches, such as capacitive charging. Alternatively, the power supply 428 may comprise a power supply unit which converts AC power from the power grid to regulated DC power for the internal components of the device 400.

The computing device 400 may also include a storage element 416. The storage element 416 includes the machine-readable medium on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the computing device 400. The instructions 424 may also reside in the static memory 406.

Accordingly, the main memory 404 and the processor 402 may also be considered machine-readable media (e.g., tangible and non-transitory machine-readable media). The instructions 424 may be transmitted or received over a network 203 via the communication interface 420. For example, the communication interface 420 may communicate the instructions 424 using any one or more transfer protocols (e.g., HTTP).

The computing device 400 may be implemented as any of a number of electronic devices, such as a tablet computing device, a smartphone, a media player, a portable gaming device, a portable digital assistant, a laptop computer, or a desktop computer. In some example embodiments, the computing device 400 may have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a non-transitory machine-readable medium capable of storing data temporarily or permanently and may be taken to include, but not be limited to, random-access memory (RAM), read-only memory (ROM), buffer memory, flash memory, and cache memory. The machine-readable medium is non-transitory in that it does not embody a propagating signal. While the machine-readable medium is described in example embodiments as a single medium, the term "machine-readable medium" should be taken to include a single medium or multiple media (e.g., a centralized or distributed database, or associated caches and servers) able to store instructions 424. The term "machine-readable medium" shall also be taken to include any medium, or combination of multiple media, that is capable of storing the instructions 424 for execution by the computing device 400, such that the instructions 424, when executed by one or more processors of the computing device 400 (e.g., processor 402), cause the computing device 400 to perform any one or more of the methodologies described herein, in whole or in part. Accordingly, a "machine-readable medium" refers to a single storage apparatus or device as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Figure 5:
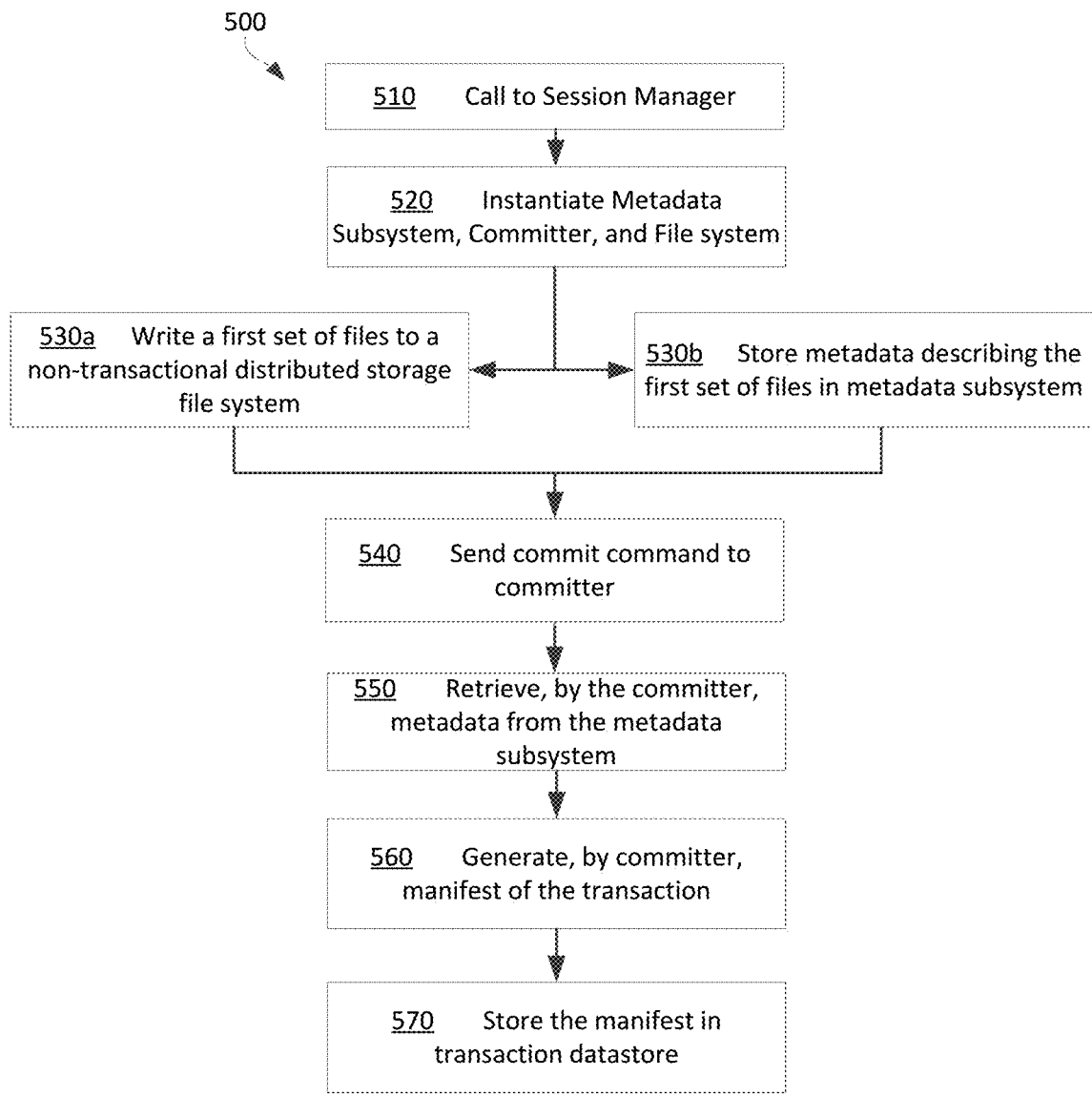
FIG. 5 depicts a flowchart illustrating an example process for providing transactional support in a non-transactional distributed storage file system, in accordance with embodiments of the present disclosure.

FIG. 5 is a flowchart illustrating a first example process 500 for providing transactional support in a non-transactional distributed storage file system, in accordance with embodiments of the present disclosure. In some examples, the process of FIG. 5 may be performed by one or more other computing devices in a distributed computing network. For example, the process described in FIG. 5 may be performed by one or more of the computing devices described below in reference to FIG. 7. The actions of the process flow 500 may represent a series of instructions comprising computer readable machine code executable by a processing unit of a computing device. In various examples, the computer readable machine codes may be comprised of instructions selected from a native instruction set of the computing device and/or an operating system of the computing device.

The process of FIG. 5 may begin at operation 510, in which a compute node (e.g., master node 290 of FIG. 2A) calls to a session manager routine (e.g., session manager 110 of FIG. 1). In response, the session manager may be initialized and processing may proceed from operation 510 to operation 520. At operation 520, the session manager may instantiate a metadata subsystem (e.g., metadata subsystem 120 of FIG. 1), a committer (e.g., committer 115 of FIG. 1), and a file system (e.g., a non-transactional file system, such as file system 150 of FIG. 1).

The process of FIG. 5 may continue from operation 520 to operation 530a and operation 530b. At operation 530a, a compute node and/or multiple compute nodes of a cluster of compute nodes may begin writing a set of files to a non-transactional distributed storage file system. For example, cluster 104a may write files through file system 150 to one or more storage nodes 132a, 132b, etc., of storage subsystem 130 as shown in operation 166 of FIG. 1. During the write of the files, the file system instantiated by the session manager (e.g., the file system 150 of FIG. 1) may generate metadata describing the files written to the distributed storage subsystem (e.g., storage subsystem 130 of FIG. 1). As previously described, metadata associated with a particular file may comprise an identification of encoding type, file format, tagging information, file pointers (and/or remote file locations if referencing locations outside the system), directory information, region identifiers, file length, file size, statistics about the files/data, filters, partition information, encryption information, etc. At operation 530b, metadata generated as a result of the write operation 530a may be stored in the metadata subsystem instantiated by the session manager (e.g., metadata subsystem 120). In various examples, the session manager may direct the file system to store the metadata in the metadata subsystem.

In the example provided in FIG. 5, a file system of the distributed storage system may not natively support transactionality. Additionally, although the process 500 describes writing files to the non-transaction distributed storage file system, the data written and committed as a transaction may not necessarily be files, but may instead be data of other types such as objects or blocks. In various examples, operations 530a and 530b may occur in parallel, although in at least some other examples, the metadata generated as a consequence of the write operation 530a may be stored in the metadata subsystem following the write operation.

Processing may continue from operations 530a and 530b to operation 540, "Send commit command to committer". At operation 540, an instruction may be sent to the committer instantiated by the session manager (e.g., committer 115) to commit at least a subset of the files written at write operation 530a as a transaction. In various examples, the committer logic may be selected by the device issuing the commit instruction, while in other examples, the committer logic may be specified by a master compute node when the session manager is called. In various other examples, a default committer for the particular file format of the file system in use may be selected.

Processing may continue from operation 540 to operation 550, "Retrieve, by the committer, metadata from the metadata subsystem". At operation 550, the committer logic may retrieve the metadata from the metadata subsystem instantiated by the session manager (e.g., metadata subsystem 120) the metadata generated at operation 530b describing the files written at operation 530a.

Processing may continue from operation 550 to operation 560, "Generate, by the committer, a manifest of the transaction." At operation 560, the commit logic may be effective to generate a manifest of the transaction (e.g., manifest 382 described above in FIG. 3A) based on the metadata retrieved from the metadata subsystem at operation 550. The manifest may describe (or define) the data (e.g., the files and/or the modified files) committed as part of a transaction. The particular committer logic may be effective to process the retrieved metadata to generate the manifest. Processing the metadata may comprise transforming and/or aggregating the metadata as described herein. The particular committer logic may be effective to selectively omit and/or modify various data in the manifest. For example, if 5 part files are written during write operation 530a, the committer logic may be effective to recognize that the 5 part files may be combined into a single file. Accordingly, the committer logic may provide instructions and/or service information in the manifest to describe a single, combined file committed during the transaction, as opposed to the 5 part files originally written. Additionally, in various examples, the particular committer logic may be effective to commit data according to various directories and/or partitions. Generally, the committer logic may define a transaction. However, the committer logic may be user specified and may be tailored to suit the particular implementation.

Processing may continue from operation 560 to operation 570, "Store the manifest in transaction datastore".

Figure 6:
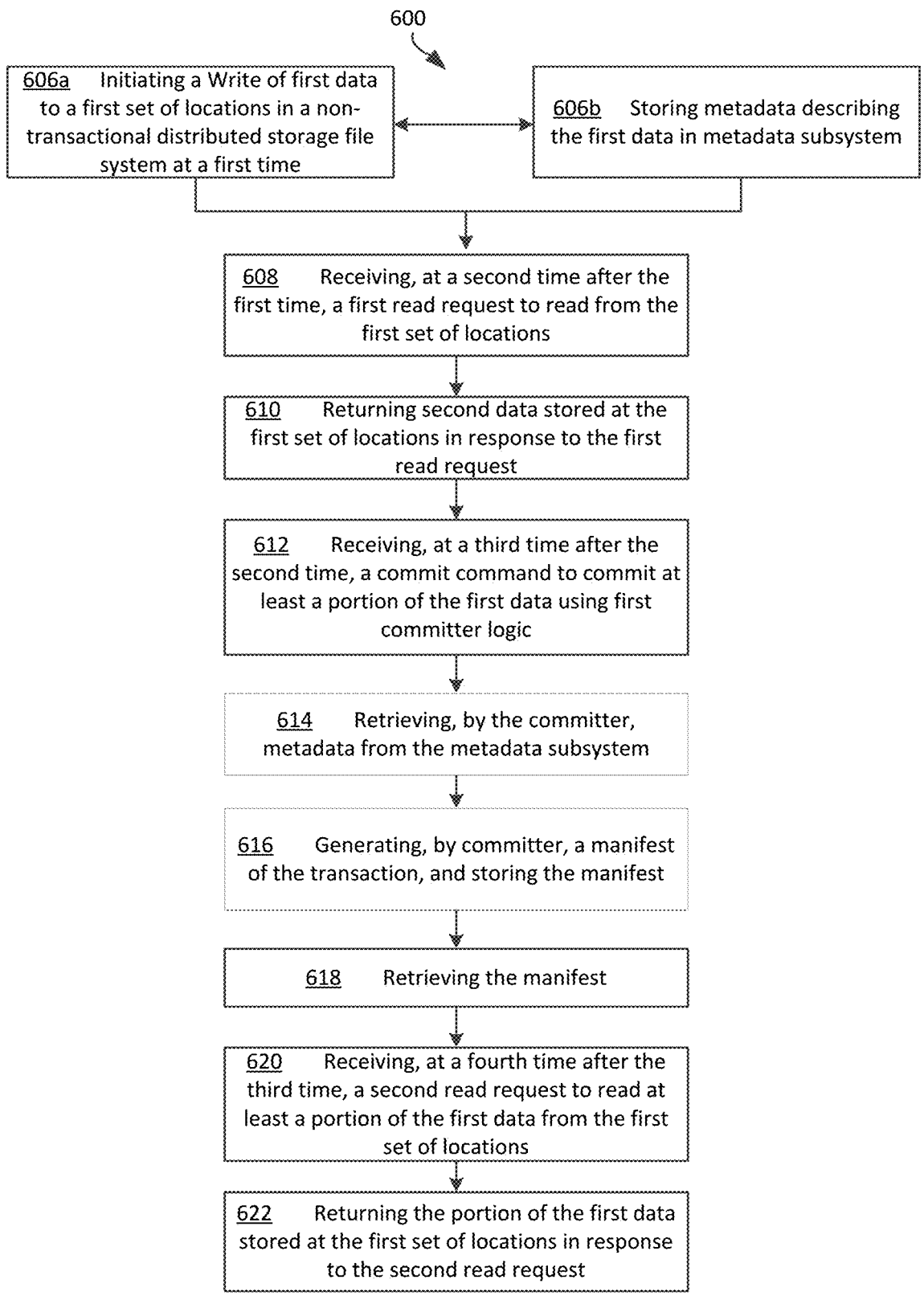
FIG. 6 depicts a flowchart illustrating an example process for receiving read requests before and after a commit operation, in accordance with the various embodiments described herein.

FIG. 6 is a flowchart illustrating an example process 600 for providing transactional support in a non-transactional distributed storage file system, in accordance with embodiments of the present disclosure. In some examples, the process of FIG. 6 may be performed by one or more computing devices in a distributed computing network. For example, the process described in FIG. 6 may be performed by one or more of the computing devices described below in reference to FIG. 7. The actions of the process flow 600 may represent a series of instructions comprising computer readable machine code executable by a processing unit of a computing device. In various examples, the computer readable machine codes may be comprised of instructions selected from a native instruction set of the computing device and/or an operating system of the computing device.

In various examples, although not depicted in FIG. 6, a compute node (e.g., master node 290 of FIG. 2A) may initiate a call to a session manager routine (e.g., session manager 110 of FIG. 1). In response, the session manager may be initialized and may instantiate a metadata subsystem (e.g., metadata subsystem 120 of FIG. 1), a committer (e.g., committer 115 of FIG. 1), and a file system (e.g., a non-transactional file system, such as file system 150 of FIG. 1).

After instantiating the metadata subsystem, the committer, and the file system, the process depicted in FIG. 6 may perform operations 606a and 606b. At operation 606a, a compute node and/or multiple compute nodes of a cluster of compute nodes may begin writing first data to a first set of locations in a non-transactional distributed storage file system at a first time. For example, cluster 104a may begin writing files through file system 150 to one or more storage nodes 132a, 132b, etc., of storage subsystem 130 as shown in operation 166 of FIG. 1 at a first time. In various examples, the first set of locations may refer to first locations in a data structure such as a distributed or non-distributed database. During the write of the data, the file system instantiated by the session manager (e.g., the file system 150 of FIG. 1) may generate metadata describing the files written to the distributed storage subsystem (e.g., storage subsystem 130 of FIG. 1). As previously described, metadata associated with a particular file may comprise an identification of encoding type, file format, tagging information, file pointers (and/or remote file locations if referencing locations outside the system), directory information, region identifiers, file length, file size, statistics about the files/data, filters, partition information, encryption information, etc. At operation 606b, metadata generated as a result of the write operation 606a may be stored in the metadata subsystem instantiated by the session manager (e.g., metadata subsystem 120). In various examples, the session manager may direct the file system to store the metadata in the metadata subsystem.

The process of FIG. 6 may continue from operations 606a, 606b to operation 608, "Receiving, at a second time after the first time, a first read request to read from the first set of locations." At operation 608, the file system instantiated by the session manager (e.g., file system 150) may receive a first read request to read from the first set of locations. In response to the read request, the file system may retrieve a previously-stored manifest to determine the appropriate data to be read in response to the read request. In the example, the write operation initiated at operation 606a may not yet have completed by the second time at which the first read request is received. The first read request may be generated by a different compute node and/or a different cluster of compute nodes relative to the compute node or nodes initiating the write of first data at operation 606a. In various examples, the first read request may be a request to read data stored at a particular location or locations in a data structure (e.g., within a particular field or fields of a distributed database). Accordingly, the first read request may result in use of a previously-stored manifest to read data stored as part of a previous transaction.

The process of FIG. 6 may proceed from operation 608 to operation 610, "Returning second data stored at the first set of locations in response to the first read request." At operation 610, the access subsystem may return data stored at the first location to the compute node and/or cluster issuing the first read request. In various examples, the data returned may represent data stored at the first set of locations prior to the commit of the first data currently being written to the first set of locations.

Processing may continue from operation 610 to operation 612, "Receiving, at a third time after the second time, a commit command to commit at least a portion of the first data using first committer logic". At operation 612, an instruction may be received by the committer instantiated by the session manager (e.g., committer 115) to commit at least a subset of the first data written at write operation 606a as a transaction. In various examples, the committer logic may be selected by the device issuing the commit command, while in other examples, the committer logic may be specified by a master compute node when the session manager is called. In various other examples, a default committer for the particular file format of the file system in use may be selected.

Processing may continue from operation 612 to operation 614, "Retrieving, by the committer, metadata from the metadata subsystem." At operation 614, the committer logic may retrieve the metadata from the metadata subsystem instantiated by the session manager (e.g., metadata subsystem 120) the metadata generated at operation 606b describing the first data written at operation 606a.

Processing may continue from operation 614 to operation 616, "Generating, by the committer, a manifest of the transaction and storing the manifest." At operation 616, the commit logic may be effective to generate a manifest of the transaction (e.g., manifest 382 described above in FIG. 3A) based on the metadata retrieved from the metadata subsystem at operation 614. The manifest may describe (or define) the data (e.g., the files and/or the modified files) committed as part of a transaction. The particular committer logic may be effective to selectively omit and/or modify various data in the manifest. For example, if 5 part files are written during write operation 606a, the committer logic may be effective to recognize that the 5 part files may be combined into a single file. Accordingly, the committer logic may provide instructions and/or service information in the manifest to describe a single, combined file committed during the transaction, as opposed to the 5 part files originally written. Additionally, in various examples, the particular committer logic may be effective to commit data according to various directories and/or partitions. Generally, the committer logic may define a transaction. However, the committer logic may be user specified and may be tailored to suit the particular implementation. As previously described herein, the manifest may be "published" (e.g., stored) at a location in one or more memories (e.g., transaction datastore 180) that is available to properly authenticated compute nodes and/or clusters of compute nodes so that the authenticated compute nodes and/or clusters can retrieve the manifest data describing the transaction.

Processing may continue from operation 616 to operation 618, "Retrieving the manifest." At operation 618, a compute node and/or cluster of compute nodes preparing to request a read of the transactional data may retrieve the manifest (e.g., from transaction datastore 180). The retrieved manifest may provide descriptions, locations, and/or services related to data committed as part of a transaction by the committer, in response to the commit command sent at operation 612. The manifest retrieved at operation 618 may be the manifest stored at operation 616 and may represent a transactional commit of at least a portion of the first data written to the first set of locations at operation 606a.

Processing may continue from operation 618 to operation 620, "Receiving, at a fourth time after the third time, a second read request to read from the first set of locations." At operation 620, a second read request may be received by the file system (e.g., file system 150). The second read request may be generated by a different compute node and/or a different cluster of compute nodes relative to the node and/or cluster initiating write operation 606a. Additionally, the second read request may be generated by a different compute node and/or a different cluster of compute nodes relative to the first read request of operation 608. In various examples, the compute node and/or cluster of compute nodes may use the manifest retrieved at operation 618 to specify the data to be read. The manifest describes the first data written during operation 606a as committed during a transaction according to the particular committer logic. Accordingly, the manifest allows a reading device to determine what data was committed during a transaction and how to access that data.

Processing may continue from operation 620 to operation 622, "Returning the portion of the first data stored at the first set of locations in response to the second read request." At operation 622, the file system may return the data requested at operation 620. In various examples, the portion of the first data committed during the transaction (as represented by the manifest) may, in some cases, be modified relative to the first data written at operation 606a according to the particular committer logic used to generate the manifest. Accordingly, the data returned at operation 622 may not directly correspond to the first data written at operation 606a.

Figure 7:
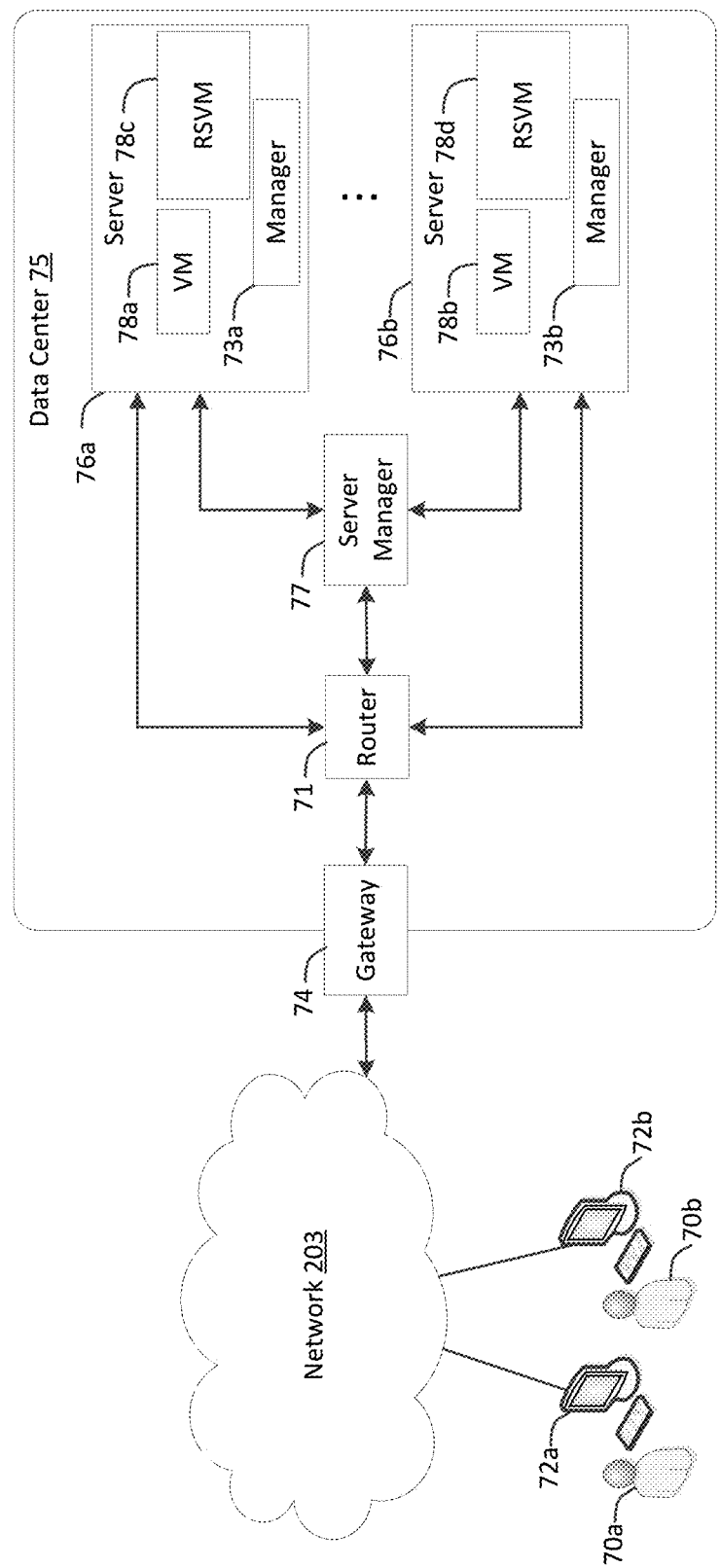
FIG. 7 depicts an example system for sending and providing data over a network, in accordance with various embodiments of the present disclosure.

An example system for sending and providing data will now be described in detail. In particular, FIG. 7 illustrates an example computing environment in which the embodiments described herein may be implemented. FIG. 7 is a diagram schematically illustrating an example of a data center 75 that can provide computing resources to users 70a and 70b (which may be referred herein singularly as user 70 or in the plural as users 70) via user computers or other network-connected devices 72a and 72b (which may be referred herein singularly as computer 72 or in the plural as computers 72) via network 203. In various examples, compute nodes described in reference to FIG. 1 may be an example of a computer or other network-connected device 72a and/or 72b. Additionally, in some examples, the network-connected devices 72a, 72b may be configured in communication as a part of a cluster of compute nodes, such as clusters 104a, 104b described in FIG. 1. Data center 75 may be configured to provide computing resources for executing applications on a permanent or an as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 203 may, for example, be a publicly accessible network of linked networks and possibly operated by various distinct parties, such as the Internet. In other embodiments, network 203 may be a private network, such as a corporate or university network that is wholly or partially inaccessible to non-privileged users. In still other embodiments, network 203 may include one or more private networks with access to and/or from the Internet.

Network 203 may provide access to computers 72. User computers 72 may be computers utilized by users 70 or other customers of data center 75. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 75. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73*a* or 73*b* (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76*a* and 76*b*. Router 71 may also be connected to gateway 74, which is connected to network 203. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a server manager 77 is also employed to at least in part direct various communications to, from and/or between servers 76*a* and 76*b*. While FIG. 7 depicts router 71 positioned between gateway 74 and server manager 77, this is merely an exemplary configuration. In some cases, for example, server manager 77 may be positioned between gateway 74 and router 71. Server manager 77 may, in some cases, examine portions of incoming communications from user computers 72 to determine one or more appropriate servers 76 to receive and/or process the incoming communications. Server manager 77 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 77 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method for providing transactional support in a distributed storage system, the method comprising:
   initializing first metadata storage;
   initializing a first file system interface, wherein a file system of the first file system interface is a non-transactional file system;
   receiving a request specifying a first committer from among other available committers, wherein the first committer is associated with the first file system interface and each of the other available committers is associated with a respective different file system interface;
   initializing the first committer;
   sending, to the first file system interface, a request to write a first set of files to the distributed storage system;
   writing the first set of files to the distributed storage system during a write operation;
   generating metadata associated with the first set of files in association with the write operation;
   storing the metadata in the first metadata storage;
   sending to the first committer, a command to commit at least a first portion of the first set of files as a transaction to the distributed storage system;
   retrieving, by the first committer in response to the command, the metadata from the first metadata storage;
   determining, by logic of the first committer based on the metadata, a modification to a file structure of a first file of the first set of files;
   generating, by the logic of the first committer, a manifest, wherein generating the manifest comprises processing the metadata to generate manifest data describing the first portion of the first set of files as a committed transaction;
   storing an indication of the modification to the file structure of the first file in the manifest; and
   storing the manifest in a transaction datastore.

2. The method of claim 1, further comprising:
   identifying, by the logic of the first committer based at least in part on the metadata, two or more part files;
   determining, by the logic of the first committer, that the two or more part files are combinable into a combined file; and
   storing, in the manifest, an indication of the combined file.

3. The method of claim 1, further comprising selecting a default committer associated with the file system as the first committer.

4. A method of storing data, the method comprising:
   writing first data to a first set of locations in a distributed computer-readable non-transitory storage system through a non-transactional file system interface;
   generating metadata associated with the first data in association with the writing of the first data;
   storing the metadata associated with the first data in at least a second location in a second computer-readable non-transitory memory;
   receiving a request specifying first committer logic from among other committer logic, wherein the first committer logic is associated with the non-transactional file system interface;
   generating a manifest defining a transactional commit of at least a portion of the first data, wherein the manifest is generated by processing the metadata using the first committer logic; and
   storing the manifest in a third computer-readable non-transitory memory.

5. The method of claim 4, further comprising:
   initializing the first committer logic;
   retrieving by the first committer logic the metadata from the second computer-readable non-transitory memory; and
   parsing, by the first committer logic, the metadata to describe the portion of the first data in the manifest.

6. The method of claim 4, wherein the first data comprises a plurality of files, the method further comprising:
   determining, by the first committer logic, a modification for a file structure of at least a first file of the portion of the first data; and storing, by the first committer logic in the manifest, an indication of a modified version of the file structure of at least the first file.

7. The method of claim 4, further comprising:
prior to writing the first data to the first set of locations in the distributed computer-readable non-transitory storage system, initializing a session manager;
instantiating, by the session manager, the second computer-readable non-transitory memory;
instantiating, by the session manager, the non-transactional file system interface; and
instantiating, by the session manager, the first committer logic effective to generate the manifest.

8. The method of claim 4, further comprising:
retrieving by the first committer logic the metadata from the second computer-readable non-transitory memory;
determining, by the first committer logic, a file directory structure to be committed as an atomic transaction;
parsing, by the first committer logic, the metadata to identify first files of the first data with the file directory structure;
generating a second manifest comprising indications of the first files of the first data; and
storing the second manifest in the third computer-readable non-transitory memory.

9. The method of claim 4, further comprising:
receiving a first read request from a first computing device to read from the first set of locations, wherein the first read request is received prior to storing the manifest in the third computer-readable non-transitory memory;
providing second data from the first set of locations to the first computing device;
receiving a second request from the first computing device to read from the first set of locations, wherein the second request is received after storing the manifest in the third computer-readable non-transitory memory; and
providing at least the portion of the first data to the first computing device.

10. The method of claim 9, further comprising:
retrieving the manifest from the third computer-readable non-transitory memory based at least in part on the second request from the first computing device, wherein the portion of the first data is provided based at least in part on the manifest.

11. The method of claim 4, further comprising:
receiving a read request from a first computing device to access the portion of the first data;
in response to the read request, retrieving the manifest, wherein the manifest comprises instructions for accessing the portion of the first data of the transactional commit;
retrieving the portion of the first data of the transactional commit according to the instructions; and
sending the portion of the first data to the first computing device.

12. A computing system comprising:
at least one processor; and
a first computer-readable non-transitory memory configured in communication with the at least one processor, the first computer-readable non-transitory memory storing instructions that when executed by the at least one processor are effective to program the at least one processor to:
write first data to a first set of locations in a second computer-readable non-transitory memory through a non-transactional file system interface;
generate metadata associated with the first data in association with the write of the first data;
store the metadata associated with the first data in at least a second location in a third computer-readable non-transitory memory;
receive a request specifying first committer logic from among other committer logic, wherein the first committer logic is associated with the non-transactional file system interface;
generate a manifest defining a transactional commit of at least a portion of the first data, wherein the manifest is generated by processing the metadata using the first committer logic; and
store the manifest in a fourth computer-readable non-transitory memory.

13. The computing system of claim 12, wherein the first data comprises a plurality of files and wherein the instructions are further effective to program the at least one processor to:
initialize the first committer logic;
retrieve by the first committer logic the metadata from the second computer-readable non-transitory memory; and
parse, by the first committer logic, the metadata to describe the portion of the first data in the manifest.

14. The computing system of claim 12, wherein the first data comprises a plurality of files and wherein the instructions are further effective to program the at least one processor to:
determine, by the first committer logic, a modification for a file structure of at least a first file of the portion of the first data; and
store, by the first committer logic in the manifest, an indication of a modified version of the file structure of at least the first file.

15. The computing system of claim 12, wherein the instructions are further effective to program the at least one processor to:
prior to writing the first data to the first set of locations in the second computer-readable non-transitory memory, initialize a session manager;
instantiate, by the session manager, the third computer-readable non-transitory memory;
instantiate, by the session manager, the non-transactional file system interface; and
instantiate, by the session manager, the first committer logic effective to generate the manifest.

16. The computing system of claim 12, wherein the instructions are further effective to program the at least one processor to:
retrieve by the first committer logic the metadata from the third computer-readable non-transitory memory;
determine, by the first committer logic, a file directory structure to be committed as an atomic transaction;
parse, by the first committer logic, the metadata to identify first files of the first data with the file directory structure;
generate a second manifest comprising indications of the first files of the first data; and
store the second manifest in the fourth computer-readable non-transitory memory.

17. The computing system of claim 12, wherein the instructions are further effective to program the at least one processor to:
receive a first read request from a first computing device to read from the first set of locations, wherein the first read request is received prior to storing the manifest in the fourth computer-readable non-transitory memory;

provide second data from the first set of locations to the first computing device;

receive a second request from the first computing device to read from the first set of locations, wherein the second request is received after storing the manifest in the fourth computer-readable non-transitory memory; and provide at least the portion of the first data to the first computing device.

18. The computing system of claim 17, wherein the instructions are further effective to program the at least one processor to:

retrieve the manifest from the third computer-readable non-transitory memory based at least in part on the second request from the first computing device, wherein the portion of the first data is provided based at least in part on the manifest.

19. The computing system of claim 12, wherein the instructions are further effective to program the at least one processor to:

receive a read request from a first computing device to access the portion of the first data;

in response to the read request, retrieve the manifest, wherein the manifest comprises instructions for accessing the portion of the first data of the transactional commit;

retrieve the portion of the first data of the transactional commit in accordance with the instructions; and send the portion of the first data to the first computing device.

* * * * *